Patented Jan. 31, 1933

1,895,694

UNITED STATES PATENT OFFICE

SAMUEL TRANIN AND JAMES C. IRWIN, JR., OF KANSAS CITY, MISSOURI, ASSIGNORS, BY DIRECT AND MESNE ASSIGNMENTS, TO TRANIN EGG PRODUCTS CO., A CORPORATION OF MISSOURI

EDIBLE COMPOUND INCLUDING EGG PRODUCTS

No Drawing. Application filed August 20, 1928. Serial No. 300,976.

Our invention relates to food products and more particularly to commodities for admixture with other materials to produce a body adapted for baking, to form a food article.

Eggs comprise an important ingredient of food and so called whole or broken eggs including whites and yolks are packaged in liquid, frozen or dry condition for delivery to housewives, bakers, confectioners and like users for mixing with the other materials such as flour to produce the dough adapted for baking to form a cake.

The oil content of the yolks, the beating qualities of the whites, and the food values and physical and other characteristics of the several egg components all contribute distinctively to produce the desired texture, taste, color, food value and other characteristics of the food product. The user has a definite formula for adding the egg constituent of a product, which is measured by weight or volume, when broken whole eggs are provided.

It is well known that a heavy demand exists for egg yolks separated from the whole eggs which are distributed widely for various uses, but that a relatively small demand exists for the whites of eggs from which the yolks have been separated.

The principal objects of our invention therefore are to provide a relatively low priced commodity adapted for the service of whole eggs in food formulæ, to enhance the beating value of a commodity useable as eggs in a recipe, to increase the beating value of a broken egg product, and to utilize the relatively inexpensive whites in products where their natural properties will be suitable, whereby the cost of ingredients of bakery products will be reduced without sacrifice of qualities and without requiring modification of recipes.

In accomplishing these and other objects of the invention, we have provided a novel composition of matter comprising a new product for use in preparing foods, and a novel process for preparing the product.

Our product comprises, in general, an edible oil, a protein material, and an egg product, and contains substantially the percentages of total solids and fat which are found in natural eggs and natural egg products.

It is common knowledge that the degree of saturation of a fat has a marked effect on the action of the fat in baking and other aspects of the preparation of food products. We therefore preferably employ fats and combinations of fats that have iodine value substantially the same as that of natural egg oil, and peanut oil is preferred as representing the oils which meet the requirements.

In a specific aspect of the invention, the product may include whites of eggs, skim milk, and peanut oil, mixed to form a compound, and the several ingredients may be provided in the following proportions, dry skim milk and water being used to secure the proper water content:

| | Per cent |
|---|---|
| Egg whites | 63 |
| Dry skim milk | 11 |
| Peanut oil | 13 |
| Water | 13 |
| | 100 |

The mixture or compound is prepared by first emulsifying the oil preferably with the milk and water, and then mixing the oil, milk, and water with the whites by ordinary stirring, the agitation being limited to prevent the beating up of the whites. The compound may then be prepared for distribution by one of the usual commercial methods for packaging broken eggs, for example by freezing, and may be used as natural eggs in the preparation of food.

In a further exemplification of the invention, a mixture including whites of eggs, a protein substance, and an emulsified oil adapted for the uses above described, for example the compound above specified, may be combined with egg products such as yolks, for example with whole eggs, in the proportions of 25 percent whole eggs, and 75 per cent compound constituent.

In preparing the compound in this form, the whole eggs in liquid form are added to the compound constituent and thoroughly intermixed therewith, but preferably without sufficient agitation to beat up the whites, and the resulting compound is packaged for use as the egg constituent in a recipe. In preparing the product the compound constituent is adapted to the particular type of egg product constituent with which it is to be combined so that the resulting compound will have substantially the same proportions of fats and solids as said egg product constituent, for example the first described formula for a compound being adapted for mixture with whole eggs to form a compound similar to whole eggs but having enhanced beating qualities, and which will be less costly than whole eggs when the protein and fat constituents comprise dry skim milk and peanut oil respectively.

In the formulæ given as examples, the skim milk supplies the major portion of the protein necessary for providing a compound mixture having a protein content substantially equal to that in an equal weight of broken eggs, the specified whites supplying a small proportion of the protein. Attention is called to the fact that the compound constituent contains an excess proportion of whites over that found in natural eggs, the chief protein element, in this case the dry skim milk, being reduced proportionally so that the total protein still is equivalent to the protein content of natural eggs, and the proportion of water being adjusted also to assure desired bulk.

The baker will handle the product as in using the ordinary commercial broken eggs, adding fats, seasoning, water, etc. for various purposes, and obtaining substantially the same results as in the use of natural eggs alone. A mixture including our product may be beaten more effectively, however, and will produce a lighter and smoother cake, one factor being the excess of whites in our product. A cake made with materials including our product may also be preferred because of the flavor imparted by the oil, particularly where peanut oil is used, the resulting flavor being analogous to egg flavor and enhancing the egg flavor.

Coloring, flavoring, seasoning, and similar accessory elements, for example salt and sugar, may be added to the compound in any of its forms, as in ordinary practice in the preparation of food products.

What we claim and desire to secure by Letters Patent is:

1. A compound for use in baking comprising an emulsion including peanut oil, casein, and water, and whites of eggs.

2. A compound for mixing with whole natural eggs to form an ingredient for bakery products, including in substantially the proportions named:

| | Per cent |
|---|---|
| Egg whites | 63 |
| Dry skim milk | 11 |
| Peanut oil | 13 |
| Water | 13 |
| | 100 |

3. A new article of commerce for use in preparing foods, comprising in substantially the proportions stated, 25 per cent natural liquid egg, and 75 per cent a compound comprising egg whites 63 per cent, dry skim milk 11 per cent, peanut oil 13 per cent and water 13 per cent.

In testimony whereof we affix our signatures.

SAMUEL TRANIN.
JAMES C. IRWIN, Jr.